United States Patent
Daude

(12) 
(10) Patent No.: US 6,699,924 B1
(45) Date of Patent: Mar. 2, 2004

(54) COLORED RUBBER COMPOSITION FOR A TIRE

(75) Inventor: Hélène Daude, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 169 days.

(21) Appl. No.: 09/583,656

(22) Filed: May 30, 2000

(30) Foreign Application Priority Data

May 28, 1999 (FR) .............................. 99 06857

(51) Int. Cl.$^7$ ................................. C08K 3/22
(52) U.S. Cl. ......................... 524/431; 524/432
(58) Field of Search ................. 524/431, 432

(56) References Cited

U.S. PATENT DOCUMENTS

| | | | |
|---|---|---|---|
| 3,296,185 A | 1/1967 | Cathey et al. | 260/41.5 |
| 5,124,390 A | 6/1992 | Miller et al. | 524/413 |
| 6,279,633 B1 * | 8/2001 | Corvasce | 152/523 |
| 6,298,889 B1 * | 10/2001 | Smith | 152/151 |
| 6,344,506 B2 * | 2/2002 | Vasseur | 524/91 |

FOREIGN PATENT DOCUMENTS

| | | |
|---|---|---|
| EP | 0463205 A | 1/1992 |
| GB | 354760 A | 9/1931 |
| GB | 555332 A | 2/1946 |

OTHER PUBLICATIONS

U.S. patent application Publication No. US 2001/0039308, Application Ser. No. 09/770,349, of Custodero et al., filed Jan. 26, 2001, "Rubber composition for a tire based on diene elastomer and a reinforcing titanium oxide."

U.S. patent application Publication No. US 2002/0004549, Application Ser. No. 09/770,411, of Custodero et al., filed Jan. 26, 2001, "Rubber composition for a tire based on diene elastomer and a reinforcing titanium oxide."

\* cited by examiner

*Primary Examiner*—Peter D. Mulcahy
(74) *Attorney, Agent, or Firm*—Baker Botts L.L.P.

(57) ABSTRACT

The invention relates to a tire comprising a colored rubber composition, the elastomeric base of which comprises primarily an essentially unsaturated diene elastomer, wherein the rubber composition comprises a mineral filler selected from titanium oxide and zinc monoxide in an amount greater than 100 parts per hundred parts by weight of elastomer (phr), and less than 10 phr sulfur.

6 Claims, No Drawings

COLORED RUBBER COMPOSITION FOR A TIRE

BACKGROUND OF INVENTION

The present invention relates to rubber compositions intended for use in the manufacture of tires.

More particularly, the invention provides colored rubber compositions intended to form at least part of the outer surface of tires. The term "colored" is understood here to exclude the color black, but to include all colors, including white.

The compositions of the invention are intended to cover the surfaces of tires at least partially, whatever the nature and the composition of the rubber mixes on which they are deposited. Since the compositions form a surface covering, they are more particularly intended to cover what are called "non-wearing" surfaces of tires, that is to say those which are not in contact with the road under normal conditions of use. Thus, such colored compositions according to the invention, which are in particular for decorative and marking purposes, may constitute, at least in part, the outer surface of a tire sidewall or the bottoms of tread patterns of the tread.

It is known that, vulcanized rubber compositions of essentially unsaturated natural and synthetic diene rubbers, because of the presence of double bonds in their molecular chains, are likely to deteriorate more or less rapidly after prolonged exposure to the atmosphere, if they are not protected, as a result of known oxidation mechanisms. These complex mechanisms have been described, for example, in the following documents: ref. [1]: "Antidegradants for tire applications" in "Tire compounding", Education Symposium No. 37 (ACS), Cleveland, Communication I, October 1995; and [2]: "Antioxidants" in Encycl. Polym. Sci. and Eng., 2d Edition, Vol. 2, 73–91.

It has been gradually possible to inhibit these oxidation phenomena as a result of the development and sale of various antioxidants, the most effective of which are, known derivatives of quinoline ("TMQ"), or derivatives of p-phenylenediamine ("PPD" or "PPDA"), which are even more active than the former, such as, for example, N-1,3-dimethylbutyl-N'-phenyl-p-phenylenediamine (6-PPD). These TMQ and PPD-type antidegradants, singly or in combination with each other, have found widespread systematically use (see, e.g., refs. [1] and [2] above) in conventional tire rubber compositions, filled at least in part with carbon black, which imparts thereto their characteristic black color.

However, the above-mentioned antioxidants, particularly the TMQ or PPD derivatives, are not light-fast. Under the action of UV radiation, they produce colored chemical types which cause an adverse color change of the rubber compositions, staining them dark brown. It is clear that this characteristic rules out the use of such agents within white, clear or colored compositions. Moreover, such characteristics of these antioxidants also cause problems when used in compositions that come into contact with white, clear or colored compositions. If nothing is done to prevent it, the antioxidants will naturally migrate into and onto the surface of the white, clear or colored compositions and stain them.

This is why it is extremely complicated to develop colored compositions intended to cover part of the outer surface of tires and to resist the staining due to the antioxidants present in the other compositions used in tires.

The majority of the solutions that have been considered are based on the use of constituents, that have impereability properties, which may be introduced into rubber compositions. In the tire field, it is known to make use of the impermeability properties of butyl rubber. However, using butyl rubber also creates a number of problems.

In order to make it possible to produce white or colored sidewalls, it has been envisaged to modify the structure of the tires by providing "screen" compositions containing a large amount of butyl rubber in order to prevent the migration of the staining antioxidants. Such screen compositions are intended to separate the white compositions from the other compositions making up said tires. It will readily be understood that such embodiments are liable to adversely affect the properties and performance of the tires concerned, to the extent that significant modifications are made to their structure. Furthermore, it is known that large proportions of butyl rubber in compositions create problems of adhesion of the latter to the other compositions present in the tire.

Other solutions have consisted of directly introducing butyl rubber into the colored compositions. Thus publication CA-2 228 692 describes a composition for white sidewalls which uses an elastomeric base containing a majority of butyl rubbers in order to constitute a barrier to the staining antioxidants. These solutions make it possible to avoid certain modifications of the structure of the tire, but do not rectify the problems linked to adhesion. This is why, since the interface obtained between white sidewalls and the other mixes present in the tire is fragile, such compositions for white sidewalls can only be deposited on very limited non-stressed parts of the sidewall, in order to avoid detachment at interfaces of the compositions.

Additional solutions involve producing compositions intended to be used within the mass and not just at the surface, which abandon the use of the antioxidants based on PPD or TMQ derivatives within these compositions. However, because such antioxidants are very effective, replacing them requires providing complex protective systems, such as those described in the publication WO 99/02590. It should furthermore be noted that it is not generally possible, in all the compositions present in the tire, to replace the antioxidants based on PPD or TMQ derivatives, which are very high-performance. Thus, because of their migration, it is necessary to provide a solution, such as that using butyl rubber, the drawbacks of which have already been mentioned.

SUMMARY OF THE INVENTION

The invention is directed to colored compositions capable of forming part of the outer surface of tires, which overcome the disadvantages of prior compositions.

The Inventor has surprisingly discovered that sulphur-vulcanizable, colored rubber compositions having a very high content of titanium dioxide or zinc monoxide, in an amount of more than 100 parts per 100 parts by weight of elastomer (phr) make it possible to produce colored surface compositions for tires which are capable of being deposited directly on compositions containing staining antioxidants without requiring the use of barrier agents typical of antioxidants, and preserve their surface color.

Although the photocatalytic activity of titanium dioxide which causes degradation of organic or biorganic molecules is known, this compound is generally used in colored rubber compositions to impart a white coloration thereto, when present in an amount of 10 to 55 parts to one hundred parts by weight of elastomer (phr), as set forth in publication CA-2 228 692.

It was thus surprising that such large quantities of titanium dioxide could be used in rubber compositions without adverse effect, since (1) its ability to degrade double bonds is contrary to desired protective characteristics provided for in the tire in order to avoid this degradation by oxidation, and (2) the fact of having a composition with a very low ratio between the amount of elastomeric base and the amount of mineral filler would lead one skilled in the art to doubt much that such a composition in the form of a mix could be produced, rather than the composition remaining in the form of a powder, and to know that such a composition would not become detached from the other compositions of the tire over time.

Zinc monoxide also has advantageous photocatalytic properties, although it is not as well used as titanium dioxide. While zinc monoxide is often used in very small amounts, of the order of several parts by weight per one hundred parts of elastomer in tire rubber compositions, for its participation in the vulcanization system of the rubber polymers, it has not been used at all for its color or for its other properties.

The subject of the invention is therefore a tire comprising a colored rubber composition, the polymeric base of which comprises primarily an essentially unsaturated diene elastomer, in which the composition contains a mineral filler selected from titanium dioxide and zinc monoxide in an amount greater than 100 parts per hundred parts by weight of elastomer, (phr), and less than 10 phr sulphur.

The invention also relates to tires, at least part of the "non-wearing" outer surface of the sidewalls of the tire and/or of the tread of which, comprising such a colored rubber composition.

DETAILED DESCRIPTION

"Diene" elastomer or rubber is understood to mean, in known manner, an elastomer resulting at least in part (i.e. a homopolymer or a copolymer) from diene monomers (monomers bearing two double carbon-carbon bonds, whether conjugated or not).

Generally, "essentially unsaturated" diene elastomer is understood to mean a diene elastomer resulting at least in part from conjugated diene monomers having a content of members or units of diene origin (conjugated dienes) which is greater than 15% (mole %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers,"highly unsaturated" diene elastomer is understood to mean a diene elastomer having a content of units of diene origin (conjugated dienes) which is greater than 50%.

These definitions being given, the following are understood to be meant by diene elastomer capable of being used in the compositions according to the invention:
(a) any homopolymer obtained by polymerization of a conjugated diene monomer having 4 to 12 carbon atoms; or
(b) any copolymer obtained by copolymerization of one or more dienes conjugated together or with one or more vinyl aromatic compounds having 8 to 20 carbon atoms.

Suitable conjugated dienes are, in particular, 1,3-butadiene, 2-methyl-1,3-butadiene, the 2,3-di($C_1$ to $C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl aromatic compounds are, in particular, styrene, ortho-, meta- and para-methylstyrene, the commercial mixture "vinyl-toluene", para-tertiobutylstyrene, the methoxy-styrenes, the chloro-styrenes, vinyl mesitylene, divinyl benzene and vinyl naphthalene.

The copolymers comprise between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, statistical, sequenced or microsequenced elastomers, and may be prepared in dispersion or in solution.

Polybutadienes are preferred, particularly those having a 1,2 bond content of between 4% and 80% and those having a content of cis-1,4 bonds of more than 90%, polyisoprenes; butadiene-styrene copolymers, and in particular those having a styrene content of between 5% and 50% by weight and, more particularly, between 20% and 40% by weight, a 1,2 bond content of the butadiene part of between 4% and 65%, and a content of trans-1,4 bonds of between 20% and 80%; butadiene-isoprene copolymers, particularly those having an isoprene content of between 5% and 90% by weight and a glass transition temperature (Tg) of −40° C. to −80° C. and isoprene-styrene copolymers, particularly those having a styrene content of between 5% and 50% by weight and a Tg of between −25° C. and −50° C.

In the case of butadiene-styrene-isoprene copolymers, there are suitable in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene part of between 4% and 85%, a content of trans-1,4 units of the butadiene part of between 6% and 80%, a content of 1,2- plus 3,4-units of the isoprene part of between 5% and 70%, and a content of trans-1,4 units of the isoprene part of between 10% and 50%, and more generally any butadiene-styrene-isoprene copolymer having a Tg of between −20° C. and −70° C., and more generally any butadiene-styrene-isoprene copolymer having a Tg of between 20° C. and −70° C.

In particular, the diene elastomer of the composition of the invention is selected from among strongly unsaturated diene elastomers which include polybutadienes (BR), polyisoprenes (IR) or natural rubber (NR), butadiene-styrene copolymers (SBR), butadiene-isoprene copolymers (BIR), butadiene-acrylonitrile copolymers (NBR), isoprene-styrene copolymers (SIR), butadiene-styrene-isoprene copolymers (SBIR), or a mixture of two or more of these compounds.

Such diene polymers may be used alone or in a blend with other elastomers conventionally used in tires, such as diene elastomers comprising:
a ternary copolymer obtained by copolymerization of ethylene and an α-olefin having 3 to 6 carbon atoms with a non-conjugated diene monomer having 6 to 12 carbon atoms, such as the elastomers obtained from ethylene or from propylene with a non-conjugated diene monomer of the afore-mentioned type, particularly 1,4-hexadiene, ethylidene norbornene or dicyclopentadiene;

a copolymer of isobutene and isoprene (butyl rubber or IIR), as well as the halogenated, particularly chlorinated or brominated (BIIR), versions of copolymer; or a copolymer of isobutene and paramethylstyrene, as well as the halogenated, particularly chlorinated or brominated (BIMS), versions of this type of copolymer.

In order to effectively implement the photocatalytic properties of the titanium dioxide or the zinc monoxide i.e., the elastomeric base has sufficient unsaturated bonds capable of being degraded, and to be able to deposit the colored compositions of the invention on any non-wearing surface of the tire as described above, it is necessary that said elastomeric base comprise primarily essentially unsaturated diene elastomers.

The compositions of the invention comprise a titanium dioxide or zinc monoxide filler in an amount greater than 100 parts per 100 parts by weight of elastomer (phr). The effects are improved by increasing the amount of mineral filler to an amount greater than 150 phr, or even greater than 200 phr. All titanium dioxides and zinc monoxides known to the person skilled in the art are suitable for use in the present invention.

Since both of these mineral fillers are white in color, any coloring pigment or optical brightening agents may be used in order to obtain a composition having a more luminous white or another color. A minimum amount of 10% by weight pigment or brightening agent relative to the quantity of mineral filler is advised in order to obtain the desired coloration. It is also possible to use these two fillers jointly or to use them in a blend with other white or coloring fillers.

Thus, it is possible to use any type of coloring agent known to the person skilled in the art, including coloring agents that are organic or inorganic, and soluble or insoluble in the compositions according to the invention. Non-limiting examples include mineral colorants, such as powdered metals, in particular powdered copper or aluminum, various metal oxides, in particular silicates, aluminates or titanates, iron oxides or hydroxides, and mixed oxides of different metallic elements such as Co, Ni, Al or Zn. Organic pigments, such as indanthrones, diketo-pyrrolo-pyrroles or diazo condensates, or organometallic pigments such as phthalocyanines, are also considered.

The color of the compositions according to the invention can thus vary within a very wide range, including different shades of red, orange, green, yellow, blue or alternatively brown or grey.

The compositions may also contain a reinforcing filler, such as carbon black or silica, to impart other types of properties to the compositions according to the invention. However, it is important to consider the color of the filler, which may modify or adversely affect the desired coloration of the composition. For example, the presence of carbon black in a very small proportion (of the order of a few phr) make it possible, with red, blue or green pigments, to obtain a dark red, dark blue or dark green coloration.

With consideration of the above-described aspects of coloration, the compositions according to the invention may contain, in addition to the compounds previously described, all or part of the constituents usually used in diene rubber compositions for tires, such as plasticizers, a cross-linking system based either on sulphur or on sulphur and/or peroxide donors, the amount of sulphur in the composition remaining less than 10 phr, vulcanization accelerators, extender oils, of the aromatic, naphthenic or paraffinic type, and also various anti-fatigue agents.

The rubber compositions are prepared using the diene elastomers according to well known techniques, by thermo-mechanical working in one or two stages in an internal paddle mixer, followed by mixing on an external mixer.

According to conventional techniques, a conventional internal mixer is used to mix the elastomers, the filler and the other constituents of the composition with the exception of the vulcanization system. The mixture obtained is then taken up on an external mixer, generally an open mill, and then the vulcanization system is added thereto. One or more stages may be added in the internal mixer, essentially with the aim of making the mixture undergo complementary thermomechanical treatment.

The invention is illustrated by the following examples, which are not intended to limit the scope of the invention.

EXAMPLES

In these examples, the properties of the compositions were evaluated as follows.

The colorimetric values are determined by means of a Microflash 200 D DATA COLOR spectrocolorimeter in D65/10 configuration (daylight; angle of observation 10°). The colorimetric properties are measured in known manner, in accordance with the instruction manual for the colorimeter (May 1995), by analyzing the reflectance spectrum of the test pieces.

These measurements are transferred to the "CIE LAB" system of the 3 three-dimensional colorimetric coordinates $L^*$, $a^*$, $b^*$, in which system:

the $a^*$ axis represents the green-red chromaticity coordinate, with a scale from −100 (green) to +100 (red);

the $b^*$ axis represents the blue-yellow chromaticity coordinate, with a scale from −100 (blue) to +100 (yellow);

the $L^*$ axis represents the luminosity coordinate, with a scale from 0 (black) to 100 (white);

$\Delta E = [(\Delta L^*)^2 + (\Delta a^*)^2 + (\Delta b^*)^2]^{1/2}$ represents the overall average calorimetric deviation of each sample relative to a non-aged control; the higher $\Delta E$ is, the more the color of the composition has changed.

In the colorimetry tests, the test pieces used were non-standardized test pieces consisting of strips of rubber of dimensions (l×w×t) of 150×150×3 in millimeters (mm), with one face A comprising a reference composition over a thickness of 2 mm and the other face B comprising over its entire thickness two strips of rubber over a width of 65 mm respectively, which are located on either side of a strip of rubber of a composition to be tested.

These test pieces were left static exposed to ambient external air for a given period, wherein face B which comprises the composition to be tested was located in the open air. At the end of this period, the surface of the face B was rubbed with an ordinary cloth impregnated with ethanol so as to remove any chalking dust which cannot be removed statically, then the colorimetric deviation $\Delta E$ was measured. A calorimetric deviation $\Delta E$ less than or equal to 25 is considered acceptable, within an approximation of ±2. In fact, such a colorimetric deviation is representative of a color change which remains within the range of the initial color.

For all the examples which follow, the composition to be tested contained an elastomeric base formed by a 60/40 mixture of a natural rubber and a polybutadiene, which are both strongly unsaturated diene elastomers.

The reference composition, referred to as composition A hereafter, is a support composition close to those used in the sidewalls of tires filled with carbon black. It is clear that these examples in no way restrict the results obtained from the superposition of compositions according to the invention on this type of conventional composition, given that the demonstration essentially depends on the presence of antioxidants in these compositions.

The formulation of reference composition A is as follows, with all the parts being expressed by weight, and in which the elastomer is a 35/65 blend of natural rubber and polybutadiene:

| Elastomer | 100 |
|---|---|
| Carbon black (N660) | 60 |
| Aromatic oil | 20 |
| Wax (a) | 1 |
| Zinc oxide | 3 |
| Stearic acid | 1 |
| TMQ | 1 |
| 6-PPD | 3 |
| Sulphenamide (b) | 0.95 |
| Sulphur | 1.6 |

(a) antiozonant wax (Redezon 500, from Repsol)
(b) sulphenamide: N-cyclohexyl-2-benzothiazyl sulphenamide.

The formulation of each of the compositions B to be tested which are used for the test pieces varied only according to the nature and quantity of filler and/or pigment used, namely a formulation below in which all the parts are expressed by weight and in which the elastomer is a 60/40 blend of natural rubber and polybutadiene:

| Elastomer | 100 |
|---|---|
| Paraffin oil | 15 |
| Stearic acid | 2 |
| Zinc oxide | 3 |

-continued

| Sulphur | 2 |
|---|---|
| Sulphenamide (a) | 2 |
| Filler and/or pigment | variable* |

(a) sulphenamide: N-cyclohexyl-2-benzothiazyl sulphenamide.
*The fillers and pigments used in the examples are as follows:
yellow 3G: yellow pigment Cromophtal (Ciba-Geigy),
silica: ultrasil VN2 (Degusssa),
titanium oxide "anatase" (Thann et Mulhouse) in Examples 1, 2, 3 and 4,
titanium oxide "rutile RL18A" (Thann et Mulhouse) in Example 3.

The following procedure was used to prepare the B compositions, used for all the examples below: The diene elastomer or the mixture of elastomers is introduced into an internal mixer filled to 75%, the temperature of which is approximately 30° C. After an appropriate kneading time, for example of the order of one minute, all the other ingredients are added except for the vulcanization system and ⅔ of the mineral filler. After another kneading time the remaining ⅓ of the mineral filler is introduced and the thermomechanical working kneading operation is continued until a given dropping temperature (165° C.) is obtained.

The mixture thus obtained is recovered, then the vulcanization system is added on an external mixer (homo-finisher) at 30° C. Vulcanization is carried out at 165° C. for 10 min.

For composition A, given the small amount of filler, it was not necessary to introduce the filler in two operations.

Example 1

The object of this example was to compare the resistance to staining of compositions including distinct fillers. The test pieces produced, as previously stated, contain the mixture of reference composition A and the B compositions to be tested having in their formulation in addition to the constituents referred to above, respectively:

compositions $B1_{(100)}$, $B1_{(150)}$, $B1_{(200)}$: 20 phr of a yellow colored pigment 3G and respectively 50/50, 75/75 and 100/100 phr of a chalk/kaolin blend, compositions $B2_{(50)}$, $B2_{(100)}$: 5 phr of a yellow colored pigment 3G and respectively 50 and 100 phr of silica, compositions $B3_{(50)}$, $B3_{(105)}$, $B3_{(150)}$, $B3_{(200)}$: 20 phr of a yellow colored pigment and respectively 50, 105, 150 and 200 phr of titanium dioxide, and compositions $B4_{(150)}$, $B4_{(200)}$: 20 phr of a yellow colored pigment 3G and respectively 150 and 200 phr of zinc monoxide.

It will be noted that for easier comparison between the different test pieces produced, contain a yellow pigment which makes it possible to have the same coloration before photo-oxidation, wherein the amount of yellow 3G is less in the case of silica, which is not an opacifying filler, contrary to the other fillers present in this example.

Compositions B3-105, B3-150, B3-200, B4-150 and B4-200 are in accordance with the invention.

The results obtained are set forth in Table 1 below.

TABLE 1

| Composition: | $B1_{(100)}$ | $B1_{(150)}$ | $B1_{(200)}$ | $B2_{(50)}$ | $B2_{(100)}$ | $B3_{(50)}$ | $B3_{(105)}$ | $B3_{(150)}$ | $B3_{(200)}$ | $B4_{(150)}$ | $B4_{(200)}$ |
|---|---|---|---|---|---|---|---|---|---|---|---|
| ΔE* | 48 | 43 | 44 | 44 | 30 | 33 | 26 | 19 | 15 | 25 | 26 |

*The ΔE were calculated after exposure of the test pieces in the open air for 90 days.

It will be noted that the compositions B1 and B2 which contain silica or chalk/kaolin mineral fillers, even in large amounts, exhibit unacceptable alterations in color. This is also the case for composition B3 which contains only 50 phr of titanium dioxide.

The other compositions B3 and B4 according to the invention are perfectly acceptable, and show that the surface has retained a yellow coloration included within the range of the initial yellow.

Example 2

The object of this example was to compare the resistance to staining of different compositions according to the invention which have different quantities of colored pigment, compared to the addition of another filler such as chalk.

The B compositions tested in the test pieces, in this example, have in their formulation, in addition to the constituents referred to previously, respectively:

compositions $B3'_{/10}$, $B3'_{/20}$, $B3'_{/50}$, $B3'_{/100}$: 105 phr of titanium dioxide and 10, 20, 50 and 100 phr respectively of yellow 3G, and compositions B3''$_{/20}$: 105 phr of titanium dioxide, 20 phr of yellow 3G and 100 phr of chalk.

The results obtained are set forth in Table 2 below.

TABLE 2

| Composition | B3'$_{/10}$ | B3'$_{/20}$ | B3'$_{/50}$ | B3'$_{/100}$ | B3''$_{/20}$ |
|---|---|---|---|---|---|
| ΔE* | 27 | 20 | 13 | 12 | 21 |

*The ΔE were calculated after exposure of the test pieces in the open air for 90 days.

It is clear that in all these compositions B3' according to the invention, the calorimetric deviation ΔE is acceptable. However, a very distinct improvement in the results was seen when a threshold of pigment corresponding to approximately 50% of the quantity of titanium dioxide in the composition is exceeded.

It can also be seen that the additional presence of another mineral filler (chalk) does not adversely affect the properties of the composition B3'', nor does it improve the results obtained.

Example 3

The object of this example was to compare different compositions according to the invention comprising forms of titanium dioxide.

The compositions B tested in the test pieces produced, in this example, have in their formulation, in addition to the constituents referred to previously, respectively:

compositions B3A$_{(105)}$, B3A$_{(200)}$: 20 phr of yellow 3G and respectively 105 and phr of titanium dioxide in the form of anatase, and compositions B3R$_{(105)}$, B3R$_{(200)}$: 20 phr of yellow 3G and respectively 105 and 200 phr of titanium dioxide in the form of rutile.

The results obtained are set forth in Table 3 below.

TABLE 3

| Composition | B3A$_{(105)}$ | B3A$_{(200)}$ | B3R$_{(105)}$ | B3R$_{(200)}$ |
|---|---|---|---|---|
| ΔE* | 19 | 16 | 16 | 18 |

*The ΔE were calculated exposure of the test pieces in the open air for 30 days.

It can be seen that the form of titanium oxide added to the composition does not affect the colorimetric deviation.

Example 4

The object of this example was to compare two compositions according to the invention with four other compositions having a different elastomeric base.

Compositions B3$_{(105)}$ and B3$_{(200)}$, the formulation of which is set forth in Example 1, were compared with compositions C having a formulation identical to that of compositions B except that the elastomeric base of C1 is EPDM and of C2 is BIIR, both of which are not essentially unsaturated diene elastomers. Compositions C1 and C2 comprise:

compositions C1$_{(105)}$ and C1$_{(200)}$: 20 phr of yellow 3G and respectively 105 and 200 phr of titanium dioxide, and compositions C2$_{(105)}$ and C2$_{(200)}$: 20 phr of yellow 3G and respectively 105 and 200 phr of titanium dioxide.

TABLE 4

| Composition | B3$_{(105)}$ | B3$_{(200)}$ | C1$_{(105)}$ | C1$_{(200)}$ | C2$_{(105)}$ | C2$_{(200)}$ |
|---|---|---|---|---|---|---|
| ΔE* | 19 | 16 | 73 | 57 | 29 | 39 |

It can be seen clearly that the use of elastomers that are not essentially unsaturated diene elastomers in compositions C1 and C2 no longer enables the titanium dioxide to act as a photodegradant, because the unsaturated bonds permitting surface self-cleaning are missing from the elastomers.

Furthermore, it can be seen that the results obtained with butyl rubber, for the compositions C2, although unacceptable, is significantly better than that obtained with EPDM, which confirms the role of a barrier played by butyl rubber because of its impermeability, but which here remains insufficient to preserve the surface color of the mix.

Thus, unexpectedly, the photocatalytic properties of titanium dioxide and zinc monoxide are used in the compositions according to the invention to degrade the elastomer itself, by introducing the titanium dioxide or the zinc monoxide into the matrix of the rubber composition, in order to obtain surface erosion which permits elimination of the staining linked to the antioxidants. In dynamic use of the tires, this "self-cleaning", which corresponds to surface renewal, also involves the disappearance of soiling coming from outside the tire, such as brake dust.

What is claimed is:

1. A tire comprising a colored rubber composition, the elastomeric base of which comprises primarily an essentially unsaturated diene elastomer, wherein the rubber composition comprises a mineral filler selected from titanium dioxide and zinc monoxide, in an amount greater than 100 parts per hundred parts by weight of elastomer (phr), less than 10 phr sulphur and at least one agent chosen from the group consisting of colored pigment and optical brightening agent, wherein the agent is in an amount greater than 10% by weight of the content of said mineral filler.

2. The tire of claim 1, in which the composition comprises the mineral filler in an amount greater than 150 phr.

3. The tire of claim 1, in which the colored pigment is present in an amount greater than 50% by weight of the content of titanium dioxide or zinc monoxide.

4. The tire according to any one of claims 1, in which the elastomeric base comprises a blend of natural rubber and polybutadiene.

5. The tire of claim 1, wherein at least part of the outer surface of a sidewall of the tire comprises the colored rubber composition.

6. The tire of claim 1, in which at least part of the outer surface of the tread of the tire comprises the colored rubber composition.

* * * * *